(12) United States Patent
Neveux, Jr.

(10) Patent No.: US 9,322,704 B1
(45) Date of Patent: Apr. 26, 2016

(54) COMPOSITE ACTIVE OPTICAL CABLES

(71) Applicant: Superior Essex Communications LP, Atlanta, GA (US)

(72) Inventor: Paul E. Neveux, Jr., Atlanta, GA (US)

(73) Assignee: Superior Essex International LP, Atlanta, GA (US)

(*) Notice: Subject to any disclaimer, the term of this patent is extended or adjusted under 35 U.S.C. 154(b) by 0 days.

(21) Appl. No.: 14/057,270

(22) Filed: Oct. 18, 2013

(51) Int. Cl.
| | |
|---|---|
| *G01J 1/04* | (2006.01) |
| *G01J 1/42* | (2006.01) |
| *G02B 6/42* | (2006.01) |
| *G06F 13/38* | (2006.01) |
| *G06F 13/40* | (2006.01) |

(52) U.S. Cl.
CPC .............. *G01J 1/0425* (2013.01); *G01J 1/42* (2013.01); *G02B 6/42* (2013.01); *G06F 13/385* (2013.01); *G06F 13/4086* (2013.01)

(58) Field of Classification Search
CPC ........................... G06F 13/385; G06F 13/4086
See application file for complete search history.

(56) References Cited

U.S. PATENT DOCUMENTS

| 7,401,985 B2 | 7/2008 | Aronson | |
|---|---|---|---|
| 7,609,926 B2 | 10/2009 | Rosenquist | |
| 8,403,571 B2 | 3/2013 | Walker | |
| 2008/0289851 A1* | 11/2008 | Varkey et al. | 174/115 |
| 2012/0141132 A1* | 6/2012 | Walker | 398/116 |

* cited by examiner

*Primary Examiner* — Francis M Legasse, Jr.

(57) ABSTRACT

Composite active optical cables are provided. An active optical cable may include a plurality of optical fibers and one or more insulated electrical conductors. In some instances, the optical fibers may be positioned within a microtube. Additionally, in some instances, the electrical conductors may include stranded conductors. A jacket may also be formed around the optical fibers and the electrical conductors. A first optical to electrical converter may be positioned at a first end of the cable, and a second optical to electrical converter may be positioned at a distal end of the cable. Further, the conductors may be configured to carry a power signal from the first end of the cable to the distal end of the cable to power the second optical to electrical converter.

20 Claims, 3 Drawing Sheets

COMPOSITE ACTIVE OPTICAL CABLES

TECHNICAL FIELD

Embodiments of the disclosure relate generally to active optical cables and, more particularly, to composite active optical cables suitable for forming remote connections with distributed input/output devices.

BACKGROUND

Cables are utilized to facilitate communication between a wide variety of different types of electronic devices, such as host devices and client devices. For example, cables may be utilized to facilitate communications between a computer and various client devices, such as a smart phone, a tablet, or a digital camera. Certain cables may additionally be configured to power or charge client devices via power received from a host device. For example, a wide variety of conventional communications cables, such as conventional universal serial bus ("USB") cables, include copper conductors that facilitate both communication and transmission of a power signal. However, as consumer expectations drive the need for higher data transfer rates, the use of copper conductors for data transmission becomes infeasible.

In order to obtain higher data transfer rates, active optical cables have been developed. Active optical cables include one or more optical fibers capable of transmitting data at higher rates that copper conductors. Additionally, active optical cables often include built in optical to electrical ("O2E") interfaces at either end of the cable. However, in conventional active optical cables, these O2E interfaces are individually powered by the respective devices connected at either end of the cable. Accordingly, it is often necessary that each device be capable of supplying power to its respective interface. Additionally, these conventional O2E cables do not permit a client device to be powered by a remote device. Accordingly, there is an opportunity for improved communication cables, and more particularly, improved active optical cables.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items, however, various embodiments may utilize elements and/or components other than those illustrated in the figures. Additionally, the drawings are provided to illustrate example embodiments described herein and are not intended to limit the scope of the disclosure.

DETAILED DESCRIPTION

Various embodiments of the present disclosure are directed to composite active cables that may be utilized to facilitate communication and/or power transmission between two electronic devices. In certain embodiments, a composite active optical cable may include one or more optical fibers and one or more conductors capable of transmitting a power signal. As desired, a plurality of optical fibers may be utilized. In certain embodiments, the plurality of optical fibers may be situated within one or more microtubes. For example, four optical fibers may be situated within a microtube. In other embodiments, tight buffered optical fibers may be utilized or, alternatively, optical fibers may be positioned within one or more buffer tubes. Additionally, suitable optical to electrical ("O2E") interfaces may be situated or positioned at each end of the cable.

The one or more conductors may include individually insulated conductors. Any number of conductors and/or conductor sizes may be utilized as desired. In certain embodiments, two conductors may be utilized. For example, two 32 American wire gauge ("AWG") conductors may be utilized. In other embodiments, three conductors may be utilized. For example, three 26 AWG conductors may be utilized. As another example, three 24 AWG conductors may be utilized. Additionally, in certain embodiments, the conductors may be stranded conductors. As a result, the conductors and the overall cable may exhibit relatively greater flexibility. In other embodiments, solid conductors may be utilized. Indeed, a wide variety of suitable conductor sizes and/or configurations may be utilized. As desired, a conductor configuration may be determined based at least in part on the power needs of the cable and/or devices intended to be connected to the cable.

According to an aspect of the disclosure, the conductors may be configured to propagate or transmit a power signal from one end of the cable to an opposite or distal end of the cable. As desired, the power signal may be utilized to power the components of an O2E interface situated at a distal end of the cable. Additionally, in certain embodiments, the power signal may be utilized to power a device (e.g., a client device) connected to the distal end of the cable. In one example application, the cable may be connected between a host device and a client device. The host device (e.g., a computer, etc.) may be capable of providing power to the cable while the client device (e.g., a smart phone, etc.) may not be suitable for providing power to the cable. For example, the client device may have a depleted battery. A power signal received from the host device may be utilized to power the O2E interface connected on the host side of the cable. Additionally, at least a portion of the power signal may be transmitted over the cable via the one or more conductors to power the O2E interface situated at the client side of the cable and/or to power a client device.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
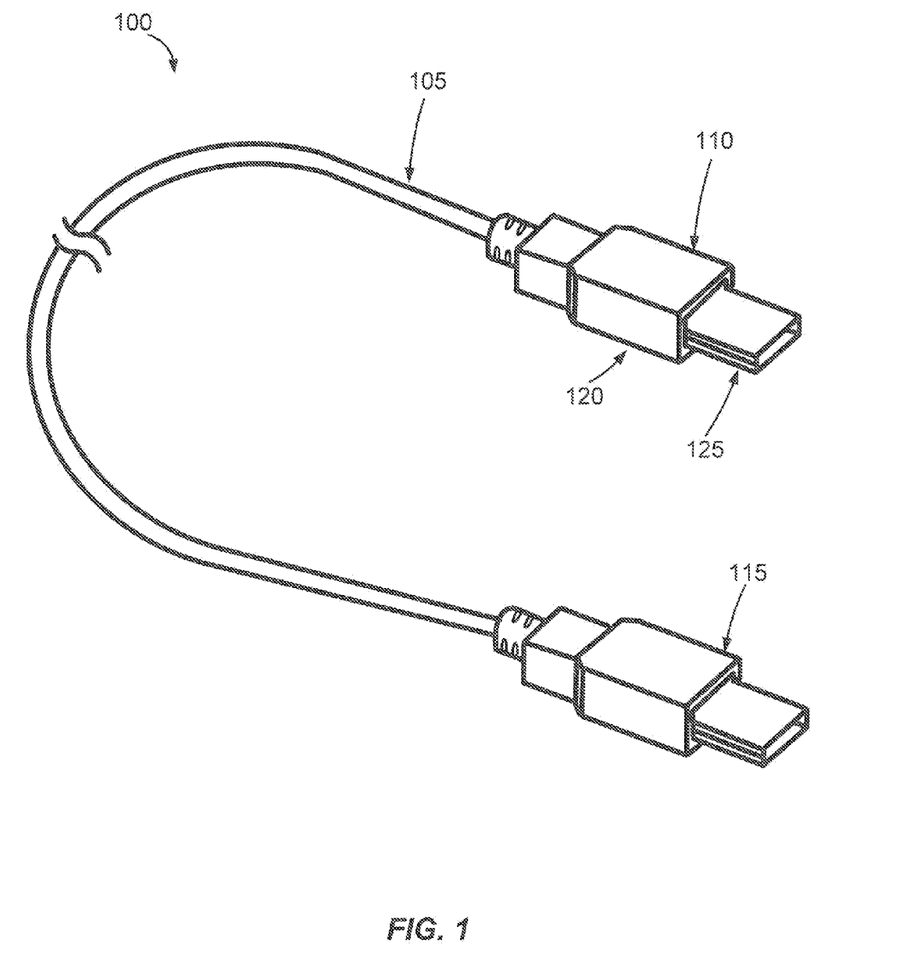
FIG. 1 is a perspective view of an example composite active optical cable, according to an illustrative embodiment of the disclosure.

With reference to FIG. 1, an example composite active optical cable 100 is illustrated. The cable 100 may include a cable portion 105, a first connector 110, and a second connector 115. The cable portion 105 may extend longitudinally between the first connector 110 and the second connector 115. As explained in greater detail below with reference to FIGS. 2 and 3, the cable portion 105 may include suitable transmission media (e.g., optical fibers, insulated electrical conductors, etc.) and/or other components positioned within an outer jacket. Each of the connectors 110, 115 may include a suitable O2E component 120 and a suitable connection element 125. In operation, electronic devices (e.g., computers, smart phones, mobile devices, personal digital assistants, digital cameras, televisions, etc.) may be connected to the connectors 110, 115, and the cable 100 may facilitate communication and, as desired, power transfer between the two devices.

For purposes of this disclosure, an O2E component, such as O2E component 120, may facilitate conversions between electrical and optical signals. For example, an electrical signal may be received by an O2E component 120 from an electronic device, and the O2E component 120 may facilitate a conversion of the electrical signal into an optical signal that may be propagated or transmitted over the cable 100. Similarly, an optical signal that has been propagated over the cable 100 may be received by the O2E component 120 and converted into an electrical signal. In other words, an O2E component may function as an interface that facilitates conversions of electrical and optical signals.

A wide variety of suitable O2E components may be utilized as desired in various embodiments. These O2E components may include a wide variety of signal receiving elements, signal transmission elements, and/or suitable circuitry that facilitates signal conversion. For example, an O2E component may include one or more photodection devices (e.g., photodiodes, etc.) and/or other devices that facilitate receipt of optical signals; one or more devices that facilitate transmission of optical signals (e.g., laser diodes, light emitting diodes, vertical-cavity surface emitting lasers ("VCSELs"), etc.); one or more wired or electrical connections; and suitable signal conversion circuitry. As desired, any number of safety circuits and/or other safety components (e.g. overcurrent protection circuits, current limiting circuits, etc.) may also be incorporated into an O2E component.

A connection element, such as connection element 125, may function as an interface between an associated connector 110 and an electronic device. In other words, the connection element 125 may function as a port or interface between the cable 100 and an electronic device. A wide variety of different types of connection elements may be utilized as desired in various embodiments. Each type of connection element may include any suitable or desired configuration, such as a suitable pin configuration. The cable 100 of FIG. 1 is illustrated as a universal serial bus ("USB") cable; however, a wide variety of other connection and/or transmission protocols may be utilized as desired in various embodiments. Examples of other suitable types of connectors include, but are not limited to, mini-USB, micro-USB, FireWire or IEEE 1394, DisplayPort ("DP"), Mini DisplayPort ("MiniDP" or "mDP"), Peripheral Component Interconnect ("PCI"), PCI Express ("PCIe"), Apple Dock, and Thunderbolt.

Additionally, although FIG. 1 illustrates similar connection elements situated at opposite ends of the cable 100, other embodiments may include different types of connection elements positioned at opposite end of the cable 100. For example, a first connector 110 may include a USB connection element while a second connector 115 includes a different type of connection element, such as a micro-USB or Thunderbolt connection element. In yet other embodiments, one or both ends of the cable 100 may be configured to receive multiple types of connection elements. For example, interchangeable connection elements may be utilized in association with the cable 100. Similarly, a wide variety of different types of adapter modules may be utilized in association with the cable 100. Indeed, a wide variety of suitable connection configurations may be utilized and embodiments should not be limited to the illustrated configuration.

Figure 2:
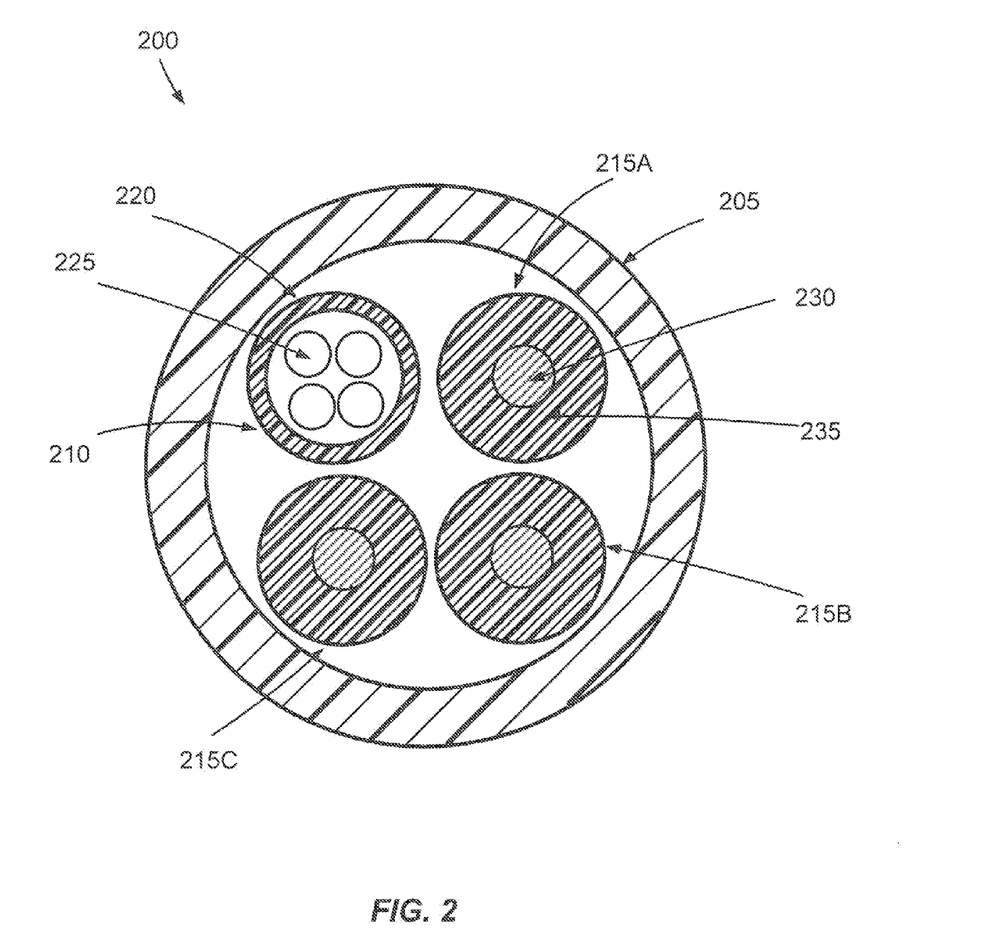
FIG. 2 is a cross-sectional view of an example composite active optical cable, according to an illustrative embodiment of the disclosure.

With reference to FIG. 2, a cross-sectional view of an example composite active optical cable 200 is illustrated. The cross-section illustrated for the cable 200 of FIG. 2 may be one example cross-section of the cable portion 105 of the cable 100 illustrated in FIG. 1. According to an aspect of the disclosure, the cable 200 may include a plurality of different types of transmission media. More particularly, the cable 200 may include one or more optical transmission media (e.g., optical fibers) and one or more conductive elements. In certain applications, the cable 200 may be utilized to connect and facilitate communication between two electronic devices. Additionally, in certain embodiments, power may be received at one end of the cable 200 and delivered to an opposite end of the cable 200.

In certain embodiments, the cable 200 may include an outer jacket 205, at least one optical transmission component 210, and one or more insulated conductors 215A, 215B, 215C. The outer jacket 205 may define one or more longitudinal openings or cable cores in which other components of the cable are situated. Although not required, a wide variety of other components may be incorporated into the cable 200 as desired. For example, one or more shielding layers, armor layers, strength members, water blocking components, and/or other transmission media may be incorporated into the cable 200.

The outer jacket 205 or jacket may enclose the internal components of the cable 200, seal the cable 200 from the environment, and provide strength and structural support. The jacket 205 may be formed from a wide variety of suitable materials, such as a polymeric material, a thermoplastic material, a thermoplastic polymer, a thermoplastic polyurethane material, polyvinyl chloride ("PVC"), polyurethane, a fluoropolymer, polyethylene, neoprene, polypropylene, plastic, rubber, acrylic, or some other appropriate material known in the art, or a combination of suitable materials. In certain embodiments, the jacket 205 may be formed from one or more suitable thermoplastic polyurethane ("TPU") materials. TPUs may include a variety of polyurethane plastics or thermoplastic elastomers that may be relatively flexible and/or have a desired elasticity for use in a cable for connecting electronic devices. Additionally, TPUs may be relatively resistance to cuts, abrasions, grease, and oil. As desired in various embodiments, the jacket 205 may also be formed from and/or include one or more flame retardant materials.

Figure 3:
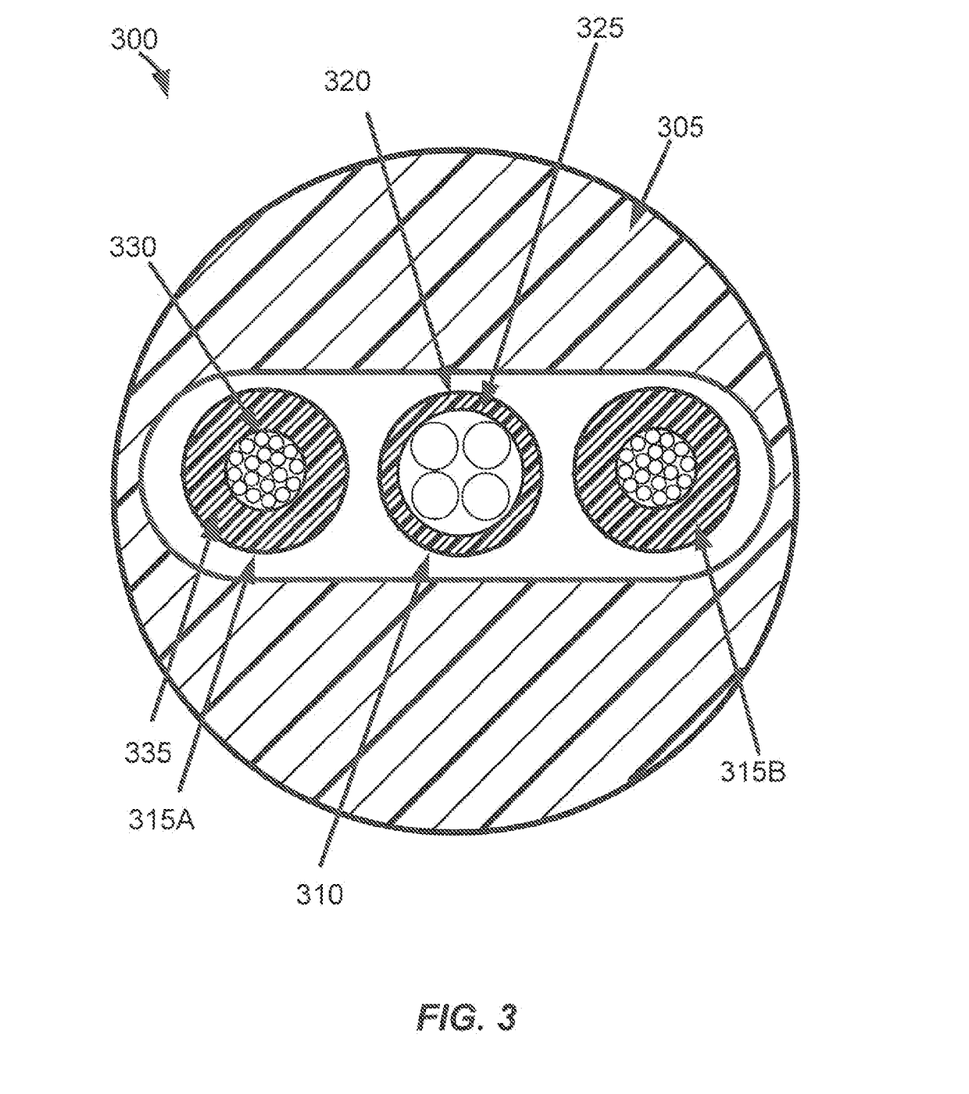
FIG. 3 is a cross-sectional view of another example composite active optical cable, according to an illustrative embodiment of the disclosure.

As desired, the jacket 205 may include a wide variety of suitable shapes and/or dimensions. For example, as shown in FIG. 1, the jacket 205 may be formed to result in a round cable or a cable having an approximately circular cross-section. In other embodiments, the jacket 205 may be formed to result in other desired shapes, such as an elliptical shape (e.g., a cable having an approximately oval cross-section). As desired in various embodiments, the jacket 205 may be a single layer jacket or, alternatively, may have multiple layers. The jacket 205 may also have a wide variety of dimensions, such as any suitable or desirable outer diameter and/or any suitable or desirable wall thickness. As shown in FIG. 3, the wall thickness of a jacket may be varied. In this regard, a cable core may have a different shape than that of the overall cable and/or multiple cable cores may be defined. In various embodiments, the jacket 205 can be characterized as an outer jacket, an outer sheath, a casing, a circumferential cover, or a shell.

In certain embodiments, the jacket 205 may have an outer diameter that is less than approximately three (3) millimeters (0.118 inches). For example, the jacket 205 may have an outer diameter that is between approximately one (1) millimeter and approximately three (3) millimeters. In this regard, a relatively small diameter cable 200 suitable for connecting electronic devices may be provided. The relatively small diameter may also result in a cable 200 that is relatively flexible and, as a result, relatively easy to route between electronic devices. Other suitable outer diameters may be utilized as desired in other embodiments.

The jacket 205 may enclose one or more openings in which other components of the cable 200 are disposed. At least one opening enclosed by the jacket 205 may be referred to as a cable core, and transmission media may be disposed in the cable core. In the cable 200 illustrated in FIG. 2, one or more optical transmission components 210 and a plurality of individually insulated conductors 215A-C may be disposed within a single cable core. In certain embodiments, the jacket 205 may be extruded or poltruded over the transmission media during construction of the cable 200. For example, one or more loose internal components and/or stranded cable components may be provided, and the jacket 205 may be formed over the internal components. In certain embodiments, the cable core may be filled with a gas such as air (as illustrated) or alternatively a gelatinous, solid, powder, moisture absorbing material, water-swellable substance, dry filling compound, or foam material, for example in interstitial spaces between the other components of the cable core.

Accordingly to an aspect of the disclosure, at least one optical transmission component 210 may be incorporated into the cable 200. Each optical transmission component 210 may include one or more optical fibers capable of transmitting communications or data signals along a length of the cable 200. As a result, relatively high data transfer rates may be achieved by the cable 200. For example, data rates of at least approximately 10 gigabits per second ("GBPS") or at least approximately 40 GBPS may be obtained. As optical fiber technology and/or optical transceiver technology improves, higher data rates may be obtained. Additionally, the use of optical fibers may permit the length of the cable 200 to be longer than certain conventional cables. For example, required USB data rates (e.g., approximately 4.8 GBPS for USB 3.0) often limit the maximum length of conventional copper USB cables to approximately three meters or less due to dielectric losses and skin effect. However, the use of optical fibers as a transmission media for data signals may permit longer cables at higher data rates.

As shown in FIG. 2, an example optical transmission component 210 may include a microtube 220 or other suitable outer sheath, and one or more optical fibers 225 may be positioned in or encapsulated by the microtube 220. A microtube 220 may have an inner diameter that is sized to allow the optical fibers 225 to move relative to one another while preventing the optical fibers 225 from crossing over or overlapping one another. In other words, the microtube 220 may permit the optical fibers 225 to flex or move as the cable 200 is flexed or bent while simultaneously maintaining the position of each optical fiber relative to the other optical fibers. In certain embodiments, an inner diameter of the microtube 220 may be determined based at least in part on the number of optical fibers 225 to be positioned within the microtube and/or the outer diameters of the optical fibers 225. Additionally, a wide variety of suitable spacings or gaps may be utilized between the inner diameter of the microtube 220 and the diameter taken up by the optical fibers 225 (e.g., a diameter of a hypothetical circle formed around the optical fibers 225). In certain embodiments, the diameter taken up by the optical fibers 225 may be approximately 2%, 3%, 4%, 5%, 6%, 7%, 8%, 9%, 10%, or any suitable range between two of these values smaller than the inner diameter of the microtube 220. Alternatively, a fill ratio of the optical fibers to the microtube may be such that the optical fibers 225 occupy approximately 85%, 88%, 90%, 92%, 95%, 97%, 98%, a value included in any suitable range between two of the above values, or any other suitable amount of an internal volume of the microtube 220. Other suitable gaps, spacings, and/or fill ratios may be utilized as desired provided that the optical fibers 225 are not permitted to cross over or overlap one another within the microtube 220.

In certain embodiments, the optical fibers 225 may be loosely positioned within the microtube 220. Additionally, the optical fibers 225 may be independently arranged within the microtube 220. In other words, each of the optical fibers may independently extend along a longitudinal length of the cable 200 without being twinned with, wrapped around, or crossed over one or more of the other optical fibers. Such a loose and independent arrangement may permit the optical fibers to shift or move within the microtube 220 to conform to bends or twists in the cable 200. However, as explained above, the size of the microtube 220 may prevent or inhibit crossover or overlap of the optical fibers, thereby limiting or reducing signal losses that may result from bends in the cable 200.

The microtube 220 may be formed from a wide variety of materials or combinations of materials. Examples of suitable materials include, but are not limited to, various polymers or polymeric materials, acrylate or acrylics (e.g., acrylic elastomers, etc.), polyvinyl chloride ("PVC"), polyurethane, a fluoropolymer, polyethylene, neoprene, ethylene, one or more polyesters, one or more polycarbonates, plastic, rubber, or other appropriate materials or combinations of suitable materials. Additionally, the microtube 220 may be formed to include any number of layers. In other words, the microtube 220 may be a single layer or a multi-layer microtube. Additionally, the microtube 220 may include a wide variety of suitable dimensions, such as any suitable inner diameter, outer diameter, and thickness. In certain embodiments, an inner diameter of the microtube 220 may be determined based at least in part upon the number and/or sizes of one or more optical fibers 225 to be situated in the microtube 220. In this regard, the microtube 220 may be formed to permit flexing or movement of the optical fibers 225 while preventing the optical fibers from crossing over or overlapping one another.

As a result of using one or more microtubes 220 containing optical fibers 225 as optical transmission components 210, it may be possible to reduce or minimize the diameter of the cable 200 relative to cables that incorporate loose buffer tubes and/or cables that incorporate tight buffered optical fibers. Loose buffer tubes have larger diameters than microtubes, thereby increasing the overall size of a cable, reducing flexibility, and reducing customer appeal for use in connecting electronic devices. Similarly, cables that incorporate tight buffered optical fibers may result in cables with larger diameters than those utilizing microtubes. For example, a microtube containing four optical fibers (e.g., optical fibers having an outer diameter of approximately 250 nanometers, etc.) may be formed with an outer diameter between approximately 0.025 inches and approximately 0.05 inches. By contrast, tight buffered optical fibers typically have a diameter of approximately 900 nanometers (or 0.035 inches). Thus, a cable with a plurality of tight buffered optical fibers will likely be larger than a cable using a microtube. As a result, it may also be possible to attain higher fiber density via the use of microtubes, thus permitting greater bandwidth in a cable. Additionally, a microtube may be formed to have a lower coefficient of friction, a lower coefficient of thermal expansion, and/or a relatively higher Young's modulus than those of tight buffered optical fibers. Thus, the microtube may provide relatively higher protection for optical fibers than that afforded by tight buffering.

Any number of optical fibers 225 may be situated within a microtube, such as microtube 220, and the fibers 225 may extend lengthwise along the cable 200. For example, one, two, three, four, eight, twelve, or some other number of optical fibers may be situated within a microtube 220. Each optical fiber may be a single mode fiber, multi-mode fiber, or some other optical waveguide that carries data optically. Additionally, each optical fiber may be configured to carry data at any desired wavelength (e.g., 1310 nm, 1550 nm, etc.) or wavelengths (e.g., 1310 nm in one direction and 1550 nm in another direction, etc.) and/or at any desired transmission rate or data rate, such as a transmission rate between approximately 10 Giga bits per second ("Gbps") and approximately 100 Gbps. The optical fibers 225 may also include any suitable composition and/or may be formed from a wide variety of suitable materials capable of forming an optical transmission media, such as glass, a glassy substance, a silica material, a plastic material, or any other suitable material or combination of materials. Each optical fiber may also have any suitable cross-sectional diameter or thickness. For example, single mode fiber may have a core diameter between approximately 8 micrometers and approximately 10.5 micrometers with a cladding diameter of approximately 125 micrometers. As another example, a multi-mode fiber may have a core diameter of approximately 50 micrometers or 62.5 micrometers with a cladding diameter of 125 micrometers. Other sizes and/or types of fibers (e.g., multicore optical fibers, etc.) may be utilized as desired.

Additionally, a wide variety of suitable techniques may be utilized as desired to incorporate a microtube 220 into the cable 200 during cable assembly. In certain embodiments, a microtube 220 may be extruded or otherwise formed over one or more optical fibers 225. For example, one or more optical fibers may be fed from suitable spools, reels, or bins, and a microtube 220 may be extruded over the one or more optical fibers 225. In other embodiments, a microtube 220 may be formed or a preformed microtube 220 may be provided. One or more optical fibers 225 may then be inserted into the microtube 220. For example, the one or more optical fibers 225 may be "air blown" into the microtube 220.

As desired in various embodiments, one or more additional components may be incorporated into a microtube 220 other than the optical fibers 225. For example, one or more strength members (e.g., strength rods, strength yarns, etc.), water swellable materials, water blocking powders, water blocking gels, filling materials, and/or other suitable components, may be situated within a microtube 220.

With continued reference to FIG. 2, the cable 200 may include any number of individually insulated conductors, such as conductors 215A-C. Three conductors 215A-C are illustrated in FIG. 2; however, other numbers of conductors may be utilized as desired in various embodiments. For example, the cable 300 of FIG. 3 includes two conductors. The individually insulated conductors 215A-C may be configured to carry one or more power signals from a first end of the cable 200 to a distal or opposite end of the cable 200. In this regard, power may be provided at the first end of the cable 200, and at least a portion of the provided power may be communicated over the cable and, as desired, utilized to power O2E circuitry at the distal end and/or an electronic device connected to the distal end.

Each individually insulated conductor (generally referred to as conductor 215) may include a conductive core 230 and an insulating or dielectric layer 235. The conductive core 230 may be formed from any suitable electrically conductive material and/or combination of materials, such as copper, aluminum, silver, annealed copper, gold, one or more metallic alloys, one or more conductive composite materials, etc. As shown in FIG. 2, in certain embodiments, the conductive core 230 may be formed as a relatively solid core, such as a relatively solid metallic core. In other embodiments (and as illustrated in FIG. 3), the conductive core 230 may be formed from a plurality of stranded conductors or wires. For example, the conductive core 230 may be formed from a plurality of copper or aluminum strands. Any number of strands may be utilized as desired, such as 7, 19, 37, 49, etc. Additionally, the use of stranded cores may enhance the flexibility of conductor 215. Thus, the use of stranded cores may enhance the overall flexibility of the cable 200.

The insulating layer 235 or insulation may include any suitable dielectric materials and/or combination of materials. Examples of suitable dielectric materials include, but are not limited to, one or more suitable polymeric materials, one or more suitable thermoplastic materials, one or more thermoplastic polymers, one or more suitable thermoplastic polyurethane materials, a thermoplastic high heat-resistant nylon-coated ("THHN") material, a thermoplastic heat and water-resistant nylon-coated ("THWN") material, a cross-linked polyethylene ("XLPE") material, a XLPE high heat-resistant water-resistant ("XHHW") material, polyvinyl chloride ("PVC"), polyurethane, one or more fluoropolymers, one or more polyesters, polyethylene, neoprene, polypropylene, plastic, rubber, acrylic, or some other appropriate material known in the art, or a combination of suitable materials. Additionally, in certain embodiments, each conductor 215 may utilize similar insulating material. In other embodiments, at least two of the conductors may utilize different types of insulating materials.

Each conductor 215 may have any suitable dimensions as desired in various embodiments. In certain embodiments, each conductor 215 may be a 32 American wire gauge ("AWG") conductor. In other embodiments, each conductor 215 may be a 24 AWG conductor. In yet other embodiments, each conductor 215 may be a 26 AWG conductor. As desired in various embodiments, each conductor 215 may have a diameter such that the conductor is between a 34 AWG conductor and a 20 AWG conductor. In other embodiments, each conductor 215 may be between a 32 AWG conductor and a 24 AWG conductor. In yet other embodiments, each conductor may have a diameter or an approximate diameter (i.e., in the event that a stranded wire does not have a circular cross-section) between approximately 0.0063 inches and approximately 0.0032 inches. In yet other embodiments, each conductor may have a diameter or an approximate diameter between approximately 0.00795 inches and approximately 0.0201 inches. Other dimensions and/or gauge sizes may be utilized as desired. Additionally, the dimensions may be based upon any number of factors, such as a desired power to be delivered by the conductors. Additionally, as desired, each of the conductors 215 may have similar dimensions or, alternatively, at least two of the conductors 215 may have different dimensions.

As shown in FIG. 2, in one example embodiment, the cable 200 may include three conductors 215A-C, and each of the conductors may have an approximately 24 AWG conductive core. The conductive core may be either solid or stranded. In an example application, the three conductors 215A-C may be configured to communicate a power signal from a first end of the cable 200 to a distal end of the cable 200. For example, the conductors 215A-C may be configured to communicate a positive voltage signal, a negative voltage signal, and a ground signal. The non-ground voltage signals may have any suitable amplitudes, such as plus and minus five volts (+/−5V), plus and minus ten volts (+/−10V), etc. In this regard, a positive and negative voltage signal, as well as a ground signal, may be provided to an electronic device connected to the cable 200.

As set forth in greater detail below with reference to FIG. 3, in another example embodiment, a cable may be formed with two conductors. Each of the two conductors may have an approximately 32 AWG conductive core formed with either a solid core or as a stranded core. In an example application, the two conductors may be configured to communicate a power signal from a first end of the cable 200 to a distal end of the cable 200. For example, the conductors may be configured to communicate a positive voltage signal and a negative voltage signal. As another example, the conductors may be configured to communicate a power signal and a reference signal. The signals may have any suitable amplitudes, such as plus and minus five volts (+/−5V), plus and minus ten volts (+/−10V), etc.

Other embodiments may include other numbers and/or sizes of conductors. As desired in various embodiments, the conductors 215 may be sized to carry signals having any desired amplitudes and/or signals capable of supplying any desired power. In certain embodiments, the number of conductors, sizes of the conductors, and/or materials used to form the conductors may be determined based at least in part upon a desired application of the cable 200. For example, a conductor configuration may be determined based at least in part upon a desired amount of power to be delivered by the cable, such as power required by an O2E component positioned at a distal end of the cable 200 and/or power required by an electronic device connected to the distal end of the cable 200.

In certain embodiments, certain components situated within the core of the cable 200 may be stranded or twisted together. For example, the conductors 215A-C and the optical transmission component 210 may be stranded or twisted together. Any suitable bunch lay or other lay length may be utilized as desired to strand the components together. In other embodiments, the conductors 215A-C and the optical transmission component 210 may be positioned within the cable core without being stranded together. For example, the components may be loosely positioned within the core. In yet other embodiments, one or more binders or wraps may be utilized to join the components together. As desired, binders or wraps may be utilized for stranded components or for non-stranded components.

A wide variety of other cable components may be positioned within a cable core as desired in various embodiments. For example, one or more strength members (e.g., strength rods, strength yarns, etc.), water swellable materials, water blocking powders, water blocking tapes, water blocking gels, filling materials, flame retardant materials, smoke suppressants, shielding members, armors, and/or other suitable components, may be situated within a cable core. Indeed, the cable 200 may include any number of desired additional components.

FIG. 3 is a cross-sectional view of another example cable 300, according to an illustrative embodiment of the disclosure. The cross-section illustrated for the cable 300 of FIG. 3 may be an example cross-section of the cable portion 105 of the cable 100 illustrated in FIG. 1. Similar to the cable 200 of FIG. 2, the cable 300 may include a plurality of different types of transmission media. More particularly, the cable 300 may include one or more optical transmission media (e.g., optical fibers) and one or more conductive elements. In certain applications, the cable 300 may be utilized to connect and facilitate communication between two electronic devices. Additionally, in certain embodiments, power may be received at one end of the cable 300 and delivered to an opposite end of the cable 300.

The cable 300 of FIG. 3 may include components similar to those of the cable 200 illustrated in FIG. 2 and discussed in greater detail above. For example, the cable 300 may include an outer jacket 305, at least one optical transmission component 310, and one or more insulated conductors 315A, 315B. The outer jacket 305 may define one or more longitudinal openings or cable cores in which other components of the cable are situated. For example, the optical transmission component 310 and the conductors 315A, 315B may be positioned within an opening or cable core defined by the outer jacket 305.

Similar to the cable 200 of FIG. 2, the outer jacket 305 may be formed from a wide variety of suitable materials and may include a wide variety of suitable shapes and/or dimensions. As shown, the jacket 305 may be formed to result in a round cable or a cable having an approximately circular cross-section; however, other shapes (e.g., an elliptical shape, etc.) may be utilized. Additionally, in contrast to the cable 200 of FIG. 2, the wall thickness of a jacket 305 may be varied. In this regard, a cable core may have a different shape than that of the overall cable 300. For example, a cable core may have an elliptical cross-section while the overall cable 300 has an approximately circular cross-section. As desired, the cable core may be sized based at least in part upon the sizes of the components situated within the cable core.

In certain embodiments, the jacket 305 may have an outer diameter that is less than approximately three (3) millimeters (0.118 inches). For example, the jacket 305 may have an outer diameter that is between approximately one (1) millimeter and approximately three (3) millimeters. In this regard, a relatively small diameter cable 300 suitable for connecting electronic devices may be provided.

The at least one optical transmission component 310 may be similar to the optical transmission component 210 illustrated in FIG. 2 and discussed in greater detail above. For example, an optical transmission component 310 may include a plurality of optical fibers positioned within a microtube.

Additionally, the conductors 315A, 315B may be similar to the conductors 215A-C illustrated in FIG. 2 and described in greater detail above. However, the cable 300 of FIG. 3 is illustrated as included two conductors rather than three conductors. Additionally, the conductors 315A, 315B are illustrated as being stranded conductors rather than solid conductors. In other words, each of the conductors 315A, 315B is illustrated as including a stranded conductor core 330 positioned within an insulating layer 335. It will be appreciated that a wide variety of different conductor configurations and sizes may be utilized as desired in various embodiments.

A wide variety of other cable components may be positioned within a cable core as desired in various embodiments. For example, one or more strength members (e.g., strength rods, strength yarns, etc.), water swellable materials, water blocking powders, water blocking tapes, water blocking gels, filling materials, flame retardant materials, smoke suppressants, shielding members, armors, and/or other suitable components, may be situated within a cable core. Indeed, the cable 200 may include any number of desired additional components.

The cables 100, 200, 300 illustrated in FIGS. 1-3 are provided by way of example only. Embodiments of the disclosure contemplate a wide variety of other cables and cable constructions. These other cables may include more or less components than the cables 100, 200, 300 illustrated in FIGS.

1-3. Additionally, certain components may have different dimensions and/or be formed from different materials than the components illustrated in the cables 100, 200, 300 of FIGS. 1-3.

As a result of providing a composite active optical cable, electronic devices may be connected with a cable that offers a relatively high data transfer rate. The optical fibers incorporated into the cable may permit relatively rapid communication of data over the cable between electronic devices. Additionally, one or more conductors may permit the transfer of power over the cable. As a result, an O2E component and/or an electronic device situated at one end of the cable may be powered via a power signal received at the other end of the cable. In other words, it is not necessary for electrical power to be received at both ends of the cable to power O2E circuitry. Thus, a single electronic device may be utilized to power both the cable and a second electronic device, such as a second electronic device that has a dead battery.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An active optical cable, comprising:
   a plurality of optical fibers loosely and independently positioned within a microtube, wherein the microtube permits shifting of the optical fibers while preventing crossover of two or more of the optical fibers during bending;
   at least one insulated electrical conductor;
   a jacket formed around the microtube and the at least one conductor;
   a first optical to electrical converter positioned at a first end of the cable; and
   a second optical to electrical converter positioned at a distal end of the cable,
   wherein the at least one conductor is configured to carry a power signal from the first end of the cable to the distal end of the cable to power the second optical to electrical converter.

2. The cable of claim 1, wherein the at least one insulated electrically conductor comprises three conductors that each have approximately the same diameter.

3. The cable of claim 1, wherein the power signal is further configured to power a client device connected at the distal end of the cable.

4. The cable of claim 1, wherein the at least one conductor comprises a stranded conductor.

5. The cable of claim 1, wherein the at least one conductor comprises either two or three conductors.

6. The cable of claim 1, wherein the at least one conductor comprises two 24 gauge conductors or two 26 gauge conductors.

7. The cable of claim 1, wherein the at least one conductor comprises three 32 gauge conductors.

8. The cable of claim 1, wherein the plurality of optical fibers comprises four optical fibers.

9. The cable of claim 1, wherein the cable has a diameter of less than approximately three millimeters.

10. An active optical cable, comprising:
    at least one optical fiber configured to carry one or more communications signals;
    at least three individually insulated conductors, each of the conductors having approximately the same diameter;
    a jacket formed around the at least one optical fiber and the at least three conductors;
    a first optical to electrical converter positioned at a first end of the cable; and
    a second optical to electrical converter positioned at a distal end of the cable,
    wherein the at least three conductors are configured to carry a power signal from the first end of the cable to the distal end of the cable to power the second optical to electrical converter and a client device connected to the distal end of the cable.

11. The cable of claim 10, wherein the at least one optical fiber comprises a plurality of optical fibers that are loosely and independently positioned within a microtube that permits shifting of the optical fibers while preventing crossover of two or more of the optical fibers during bending.

12. The cable of claim 10, wherein each of the at least three conductors comprises a plurality of strands of electrically conductive material.

13. The cable of claim 10, wherein the at least three conductors comprise 32 gauge conductors.

14. The cable of claim 10, wherein the at least three conductors comprise 24 gauge conductors or 26 gauge conductors.

15. The cable of claim 10, wherein the cable has a diameter of less than approximately three millimeters.

16. An active optical cable, comprising:
    a plurality of optical fibers configured to carry one or more communications signals, the plurality of optical fibers loosely and independently arranged within a microtube that permits shifting of the optical fibers while preventing crossover of two or more of the optical fibers during bending;
    at least three individually insulated conductors, each of the conductors having approximately the same diameter,
    a jacket formed around the microtube and the at least three conductors;
    a first optical to electrical converter positioned at a first end of the cable; and
    a second optical to electrical converter positioned at a distal end of the cable,
    wherein the at least three conductors are configured to carry a power signal from the first end of the cable to the distal end of the cable to power the second optical to electrical converter and a client devices connected to the distal end of the cable.

17. The cable of claim 16, wherein the at least three conductors comprises at least three 32 gauge conductors.

18. The cable of claim 16, wherein each of the conductors comprises a plurality of strands of electrically conductive material.

19. The cable of claim 16, wherein the at least three conductors comprises at least three 24 gauge conductors or three 26 gauge conductors.

20. The cable of claim 16, wherein the cable has a diameter of less than approximately three millimeters.

\* \* \* \* \*